Figure 1:
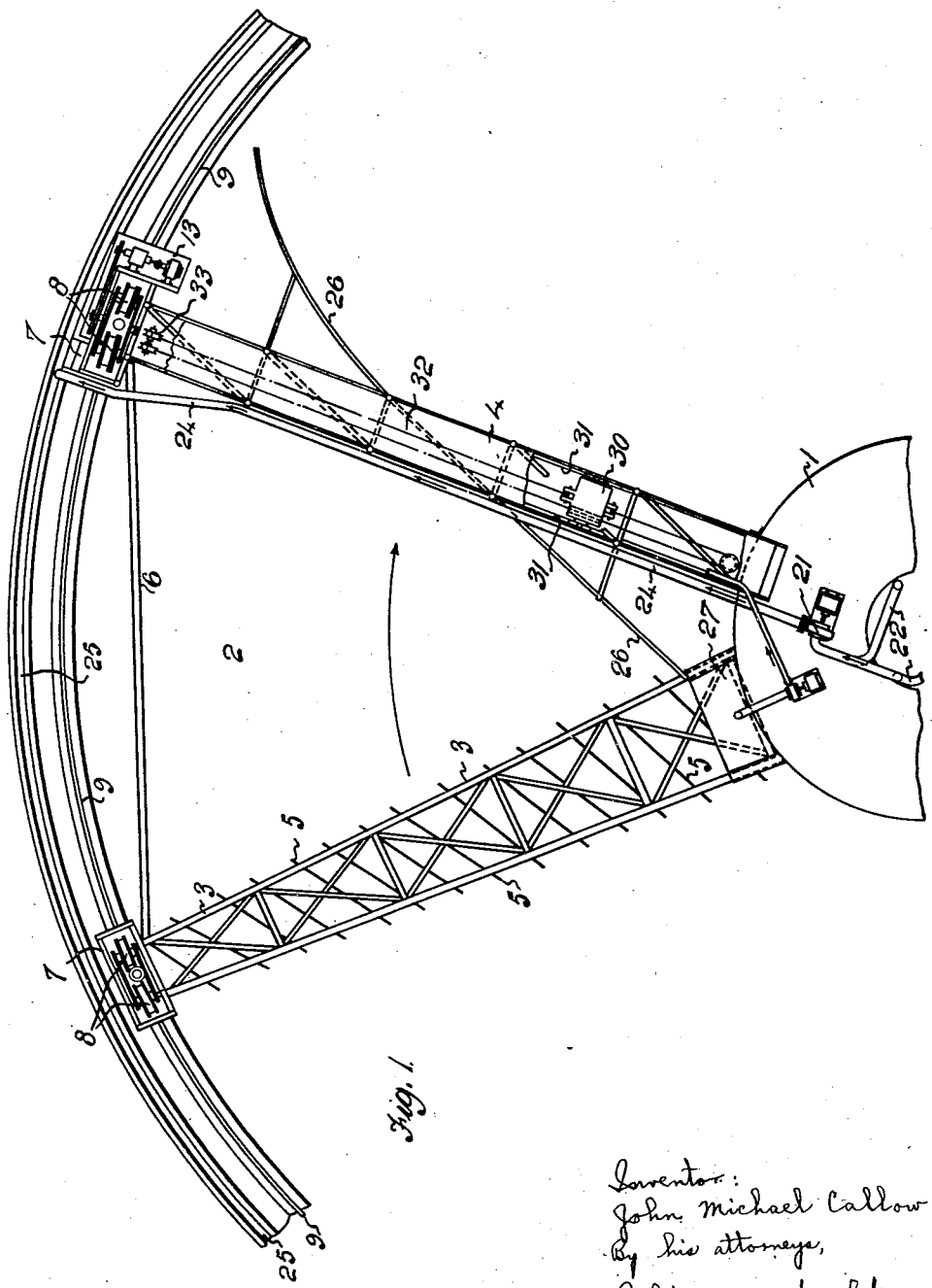

Dec. 1, 1936.   J. M. CALLOW   2,062,988
SETTLING TANK
Filed Feb. 21, 1936    2 Sheets-Sheet 1

Inventor:
John Michael Callow;
By his attorneys,
Baldwin + Wight

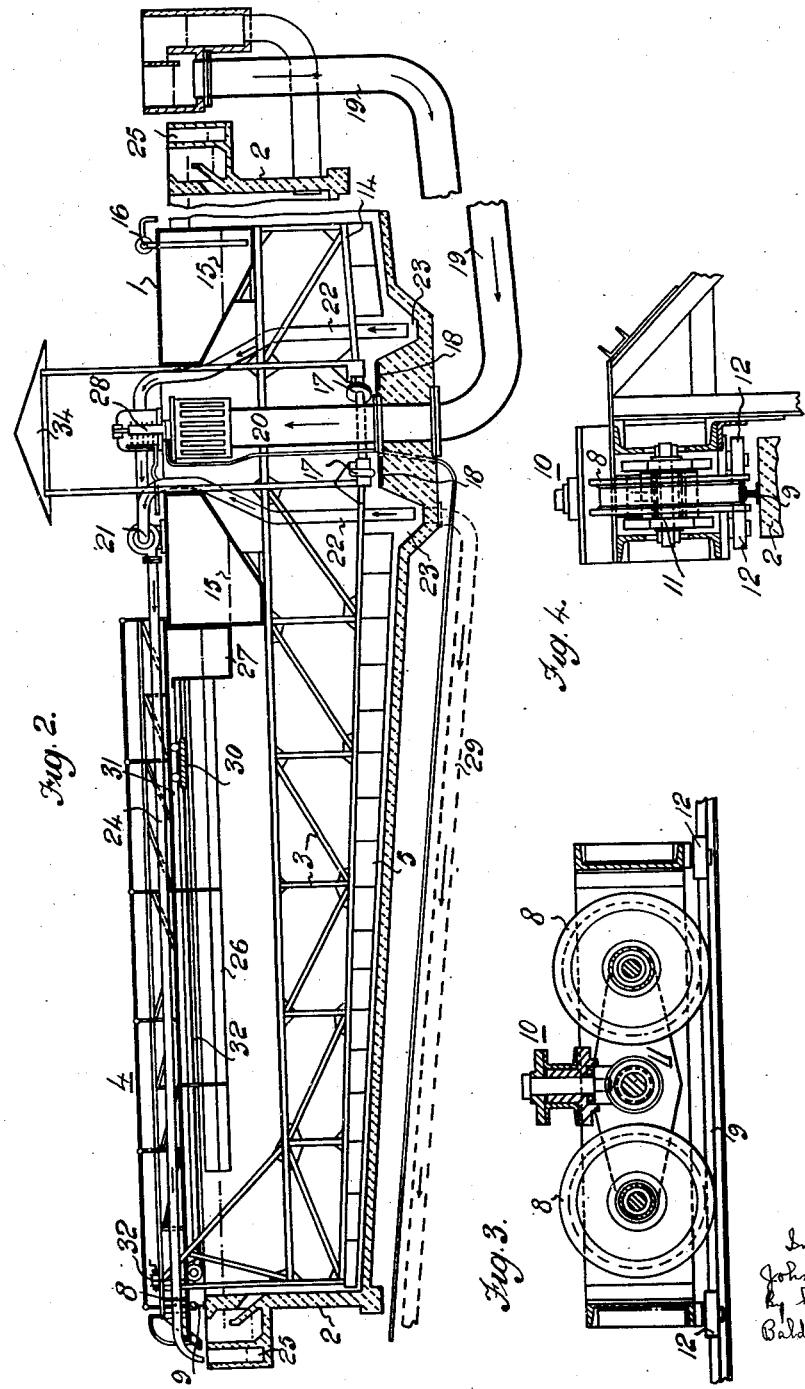

Patented Dec. 1, 1936

2,062,988

UNITED STATES PATENT OFFICE 2,062,988

SETTLING TANK

John Michael Callow, London, England, assignor to British-Geco Engineering Company, Limited, London, England Application February 21, 1936, Serial No. 65,143
In Great Britain December 7, 1935

25 Claims. (Cl. 210—55)

This invention relates to improvements in settling tanks and in particular to that class of tank known as a "thickener" employed for settling and removing solids out of liquids. Such tanks are used in the treatment of sewage, ore pulps and other industrial operations wherein sedimentation and removal of solids from their accompanying water and/or solutions are to be performed.

Various types of such tanks are already known, which have the common features of settling areas in which the pulps to be treated are brought to a state of relative quiescence by revolving or travelling arms fitted with blades which plough or scrape the settled and thickened solids to some central point of discharge; and of a peripheral overflow edge for the discharge of the clarified water or solutions. There are three general types having these features, the types differing, however, in that in the first the plough arms are revolved by a central shaft suitably mounted on a stationary truss or bridge spanning the tank; in the second these arms are attached to a central drum or sleeve surrounding a central stationary column which acts as a support for a centralizing bearing, the drum and its arms being revolved by a driving arm extending over to the rim of the tank and actuated by motor-driven traction wheels thereon; in the third the plough arms consist of a three armed submerged truss or bridge extending across the whole diameter of the tank and supported from a rim-track on wheeled carriages to one or more of which carriages motive power is applied to cause the structure to revolve.

The object of the present invention is to provide an improved settling tank of simplified construction, which is particularly suitable for, but not limited to, the large diameter tanks now employed, since it obviates the necessity of a long span bridge. Further it dispenses with a central fixed supporting column for the sludge gathering rakes and it allows for irregularities of the track which are liable to give rise to trouble when a central fixed column is used, especially with large tanks.

According to the invention the tank apparatus comprises a pontoon normally floating in the liquid contents of the tank, two or more arms radiating therefrom, one at least of which arms constitutes a plough or raking arm, and driving means associated with one or more of said arms, the outer ends of the arms being supported by travelling means on a track around the periphery of the tank. By "pontoon" I mean a movable float capable of supporting weight other than its own and whose depth of submergence under a given load is dependent upon its displacement of liquid, independently of the volume or pressure of any entrapped body of air or other gas. Thus, the term "pontoon" as used in the description and claims defines a liquid displacing float in the ordinary and conventional sense of the term as distinguished from means such as a bell or inverted chamber immersed in liquid and buoyed up by a force dependent upon the volume and/or pressure of the air or other gas entrapped by the bell.

The weight of the pontoon is preferably adjustable so as to vary its vertical position in the liquid, such adjustment being provided for example by liquid ballast, the amount of which is controlled by a hand- or motor-driven pump. A supplementary or additional method of ballasting the pontoon may be by means of one or more counterweights mounted to slide on one or more of the arms.

Two radiating arms as described are preferably provided, the one constituting the raking arm, and being normally submerged in the liquid, whilst the other is above the surface of the liquid and constitutes the driving arm. This second arm may also form a walk way to the pontoon, and a bridge for carrying any pipes, cables, etc. which may be required in the working of the apparatus.

The arms may be suitably interconnected by a tie bar or the like to increase the rigidity of the structure. Their outer ends, moreover, are preferably supported on wheeled carriages which are so constructed and connected with the arms as to allow for irregularities in the track by being capable of rocking both about a vertical and a horizontal axis.

A preferred form of construction according to the invention is illustrated in the accompanying drawings in which Figure 1 is a partial plan view, Figure 2 a sectional elevation partly broken away, and Figures 3 and 4 detail views of the bogie carriages.

Referring to the drawings, a pontoon 1 floating centrally within a circular tank 2 provided with a bottom sloping downwards towards the centre has secured thereto a rake arm 3, and a driving arm 4, lying at about 45° to each other, the rake arm depending below the water line and having along its lower edge the normal blades, scrapers or ploughs 5 which serve to engage and gather or sweep the sludge, etc. into the centre of the bottom of the tank, whilst the driving arm is located above the water line. The arms are interconnected adjacent their outer ends by a chordal tie bar 6.

Both arms at the outer ends are connected to carriages 7 having bogie wheels 8 adapted to run on a rail 9 forming the track surrounding the tank. The bogies are connected to the appropriate arm through a vertical swivel 10 and they are provided with a horizontal swivel 11 between the wheels of which there are two running on the track behind each other, the articulated swivels 10 and 11 providing universal joint connection between the carriages 7 and the arms 3 and 4, respectively.

The bogies are provided with fore and aft pairs of guide rollers 12 running on the sides of the track rail. For larger tanks the bogies may each have more than one pair of wheels, each pair having a horizontal swivel.

Located on the bogie carriage of the drive arm is a driving means 13, consisting for example of an electric motor driving the bogie wheels through suitable reduction gearing.

In addition to the main raking arm 3 which extends over substantially the full radius of the tank one or more further raking arms 14 are provided which are secured to the pontoon 1 but only extend a short distance from the centre of the tank, since it may be found that whereas one set of blades can deal with the sludge, etc. near the sides of the tank, this is not sufficient for the heavier work adjacent the centre of the tank.

The raking mechanism can be raised or lowered according to demands by increasing or decreasing the amount of the water ballast 15 carried in the pontoon by a hand or power operated pump 16 located on the pontoon for that purpose. Instead of or in addition to the water ballast a counterweight 30 may be provided, the counterweight sliding along rails 31 secured beneath the arm 4, and being controlled by means of a rope 32 and winch 33.

Under normal operation the ballasting of the pontoon will be adjusted so as to maintain the rake blades safely clear of the bottom of the tank, but if for any reason the water level should be lowered by a failure of the supply or when emptying the tank or the submergence of the pontoon is suddenly increased by the addition of some unaccustomed weight, three or more equally spaced track wheels 17 are provided, attached to the lower part of the raking structure in the vicinity of the centre, which at such times will come in contact with a track 18 located slightly above the bottom of the tank and thus sustain the arms at such a position and elevation as to prevent the scrapers or ploughs coming in contact with the tank bottom and being injured or destroyed.

The track 18 is of such width as to allow a certain latitude for sideways motion of the rollers thereover, which may be required in view of irregularities in the peripheral track above referred to.

The preferred way of introducing the feed to the tank is as illustrated by means of an inverted siphon pipe 19 starting from a source sufficiently higher than the level of the tank's contents to give the necessary velocity to overcome pipe friction and prevent choking, and finishing in an upward extension 20 in a central hollow on the pontoon and near, but some distance below, the surface level of the tank.

It may alternatively be introduced into a central feed well by piping or a launder carried on a stationary bridge for the purpose, the outer end of which bridge is supported at the tank periphery and the inner end carried by a suitable revolving swivel secured to the centre of the pontoon.

The thickened solids or sludge are removed by a suitable sludge pump 21 carried on the pontoon and revolving with it, the suction pipe 22 of the pump being bifurcated, and each branch terminating in a circular gutter 23 in the centre of the tank bottom into which the sludge is directed by the ploughs or scrapers. The sludge may, however, be removed in a known manner by an underflow pipe 29.

The thickened sludge is elevated by the pump 21 and is conducted by piping 24 over the driving arm and spilled into a circular trough 25 surrounding the tank, this trough having a steep annular pitch leading to a common sludge well 20 (not shown) and from thence to any desired position for further treatment as required. The piping may, however, be conducted over a bridge or other arm provided for that purpose.

In sewage plants it is often necessary to remove grease and other floating debris from the surface of the water and for this purpose a skimmer plate 26 connected to the main raking arm 3 and to the driving arm 4 tangentially to the pontoon, being curved at its outer end and extending a short distance below the liquid surface, moves with the arms and skims all surface accumulations towards the centre into an open can or reservoir 27 close to the pontoon, from which it is periodically removed by a suitable suction pump. The same device is also adapted to remove froth or similar floating matters from settling tanks in ore treatment and flotation plants.

The electric current for the motors operating the wheeled traction carriages and the sludge pump is taken, as illustrated, from a central armature and brush column 28 posed on the top of the feed inlet column 20, the apparatus being suitably protected against weather conditions by a housing 34.

The current may, however, be taken from a "second rail" or an overhead trolley system encircling the tank.

The apparatus according to the invention has many obvious advantages. Particularly it is an improvement in avoiding the necessity of a central supporting column, which, as is well known, must be rigidly built to stand the central load, and equipped with an expensive bearing, especially where this bearing must be slidable as well as rotatable to overcome irregularities in the track. This expensive mechanism with its inherent mechanical and structural defects, is replaced simply according to the invention by the pontoon.

What I claim is:—

1. Sedimentation apparatus comprising a tank, a track surrounding said tank, travelling supporting means resting upon and being constrained to follow said track, a pontoon normally floating upon liquid in the tank, an arm supported both by said pontoon and by said travelling supporting means, and sludge-engaging means carried by said arm.

2. Sedimentation apparatus comprising a tank, a track surrounding said tank, travelling supporting means resting upon and being constrained to follow said track, a pontoon normally floating upon liquid in the tank, an arm supported on and secured to both said pontoon and said travelling supporting means, whereby the lateral positioning of said arm and said pontoon is effected by said track and said travelling supporting means, and sludge-engaging means carried by said arm.

3. Sedimentation apparatus comprising a tank, a track surrounding said tank, travelling supporting means resting upon and being constrained to follow said track, a pontoon floating upon liquid in the tank and being normally free from engagement with any part fixed with respect to the tank, an arm supported both by said pontoon and by said travelling supporting means, and sludge-engaging means carried by said arm, the horizontal positioning of said arm and said pontoon being effected solely by said track and said travelling supporting means.

4. Sedimentation apparatus comprising a tank, a track surrounding said tank, travelling supporting means resting upon and being constrained to follow said track, a pontoon normally floating upon liquid in the tank, a plurality of radial arms supported both by said pontoon and by said travelling supporting means, sludge-engaging means carried by at least one of said arms, and driving means operatively connected to at least one of said travelling means for effecting movement of the latter along said track.

5. Sedimentation apparatus comprising a tank, a track surrounding said tank, travelling supporting means resting upon and being constrained to follow said track, a pontoon normally floating upon liquid in the tank, a plurality of radial arms each having its inner end supported on said pontoon and its outer end supported on said travelling means, means securing said arms in assembled relation to move together, said pontoon being free from restraint against lateral movement except for the restraining effect of said track, said travelling supporting means and said arms, and sludge-engaging means carried by at least one of said arms.

6. Apparatus as set forth in claim 1 and including in combination therewith, means for varying the normal submergence of said pontoon.

7. Settling tank apparatus comprising a track around the periphery of the tank, a pontoon normally floating in the liquid contents of the tank, liquid ballast for said pontoon, a pump for increasing or decreasing the amount of ballast, a plurality of arms secured to and radiating outwardly from said pontoon, sludge-engaging means carried on at least one of said arms, travelling means supporting the outer ends of said arms and adapted to run on said track, and driving means associated with one of said arms and being operatively connected to the travelling means which supports the outer end of that arm.

8. Settling tank apparatus comprising a track around the periphery of the tank, a pontoon normally floating in the liquid contents of the tank, a plurality of arms secured to and radiating outwardly from said pontoon, sludge-engaging means carried on at least one of said arms, travelling means supporting the outer ends of said arms and adapted to run on said track, driving means associated with one of said arms and being operatively connected to the travelling means which supports the outer end of that arm, and at least one counter-weight sliding along at least one of said arms to vary the normal submergence of the pontoon.

9. Settling tank apparatus comprising a track around the periphery of the tank, a pontoon normally floating in the liquid contents of the tank, a plurality of arms secured to and radiating outwardly from said pontoon, sludge-engaging means carried on at least one of said arms, wheeled carriages, means mounting said arms respectively on said wheeled carriages for swivelling movements about both vertical and horizontal axes, and driving means on one of said arms and being operatively connected to the wheels of the carriage which supports that arm.

10. Settling tank apparatus comprising a track around the periphery of the tank, a pontoon normally floating in the liquid contents of the tank, a plurality of arms secured to and radiating outwardly from said pontoon, sludge-engaging means carried on at least one of said arms, travelling means supporting the outer ends of said arms and adapted to run on said track, driving means associated with one of said arms and being operatively connected to the travelling means which supports the outer end of that arm, said travelling means comprising carriages, bogies in said carriages, vertical swivels connecting the bogies to the arms, tandem wheels in said bogies and horizontal swivels between said wheels whereby the wheels can rock vertically and horizontally with respect to said arms, and an electric motor carried by one of said carriages for driving the same.

11. Apparatus as set forth in claim 5 and including in combination therewith, a surface skimmer plate secured to one of said arms, and a reservoir adjacent the pontoon and adapted to receive material skimmed off by said skimmer plate.

12. Apparatus as set forth in claim 5 and including in combination therewith, a surface skimmer plate secured to at least one of said arms and extending obliquely with respect thereto, the forward end of the plate being curved toward the direction of its movement, and a reservoir adjacent the pontoon and adapted to receive material skimmed off by said skimmer plate.

13. Apparatus as set forth in claim 1 and including in combination therewith, an additional arm secured to the pontoon and extending only a short distance outwardly therefrom, and additional sludge-engaging means carried by said last named arm.

14. Apparatus as set forth in claim 1 and including in combination therewith, a central track located within the tank and below the normal level of the liquid therein, and track-engaging means on the bottom of said pontoon and being adapted, when the liquid is below a predetermined minimum level in the tank, to rest upon said central track to thereby prevent the said sludge-engaging means contacting the bottom of the tank.

15. Apparatus as set forth in claim 1 and including in combination therewith, a central track located within the tank and below the normal level of the liquid therein, and rolling elements journalled on the bottom of said pontoon and being adapted, when the liquid is below a predetermined minimum level in the tank, to rest upon said central track to thereby prevent the said sludge-engaging means contacting the bottom of the tank, said central track being of sufficient width to provide latitude for sideways motion of said rolling elements.

16. Sedimentation apparatus comprising a tank, a track surrounding said tank, travelling supporting means resting upon and being constrained to follow said track, a pontoon normally floating upon liquid in the tank, an arm supported both by said pontoon and by said travelling supporting means, sludge-engaging means carried by said arm, a second arm supported upon said pontoon and upon said travelling supporting means, driving means operatively connected to the travelling supporting means on which said second arm is supported, and a tie bar interconnecting said arms.

17. Apparatus as set forth in claim 1 and including in combination therewith, an inverted siphon feed pipe extending up centrally from underneath the pontoon.

18. Settling tank apparatus comprising a track around the periphery of the tank, an annular pontoon normally floating in the liquid contents of the tank, a plurality of arms secured to and radiating outwardly from said pontoon, sludge-engaging means carried on at least one of said arms, travelling means supporting the outer ends of said arms and adapted to run on said track, driving means associated with one of said arms and being operatively connected to the travelling means which supports the outer end of that arm, and an inverted siphon feed pipe extending into the central opening in the annular pontoon.

19. Settling tank apparatus comprising a track around the periphery of the tank, a pontoon normally floating in the liquid contents of the tank, a plurality of arms secured to and radiating outwardly from said pontoon, sludge-engaging means carried on at least one of said arms, travelling means supporting the outer ends of said arms and adapted to run on said track, driving means associated with one of said arms and being operatively connected to the travelling means which supports the outer end of that arm, and a gutter centrally located in said tank and a pump for removing sludge from the tank, the suction pipe of said pump extending into said gutter.

20. Sedimentation apparatus as set forth in claim 19 and in which the suction pipe is bifurcated.

21. Sedimentation apparatus as set forth in claim 1 and including in combination, a gutter centrally located in said tank, and an exhaust pipe communicating with the bottom of said gutter and located below the tank.

22. Settling tank apparatus comprising a track around the periphery of the tank, a pontoon normally floating in the liquid contents of the tank, two arms secured to and radiating outwardly from said pontoon, sludge-engaging means carried on at least one of said arms, a tie bar interconnecting said arms, at least one additional arm mounted on said pontoon and extending only a short distance outwardly from the center of said tank, sludge-engaging means carried by said additional arm, a plurality of wheels or rollers secured to and beneath said pontoon, a central track raised above the bottom of the tank, said wheels or rollers being adapted when the liquid level in the tank is low to run on said central track so as to prevent the sludge-engaging means contacting with the bottom of the tank, said central track being of sufficient width to allow a certain latitude for sideways motion of the wheels or rollers thereover, travelling means supporting the outer ends of said two arms and adapted to run on said track, said travelling means comprising carriages, bogies in said carriages, vertical swivels connecting the bogies to the arms, tandem wheels in said bogies and horizontal swivels between said wheels whereby the wheels can rock vertically and horizontally with respect to said arms, a motor carried by one of said carriages and being connected to the wheels thereof for driving the same, a skimmer plate attached to one of said arms and secured obliquely across one of the other arms at about the surface level of the tank contents, the forward end of the plate being curved toward the direction of its movement, and a reservoir adjacent the pontoon into which the skimmer plate is adapted to scrape grease, scum and the like.

23. Sedimentation apparatus comprising a tank, a track surrounding said tank, travelling supporting means resting upon and being constrained to follow said track, a pontoon normally floating upon liquid in the tank, an arm supported both by said pontoon and by said travelling supporting means, sludge-engaging means carried by said arm, means for feeding material to said tank substantially at the center thereof, and peripheral overflow means surrounding said tank.

24. Sedimentation apparatus comprising a tank, a track surrounding said tank, a support substantially at the center of the tank, an arm having its inner end carried on said support, sludge-engaging means carried by said arm, and means for supporting the outer end of said arm comprising a wheeled truck adapted to travel on said track and universal joint means connecting said truck to the outer end of said arm for relative movements about both horizontal and vertical axes.

25. Sedimentation apparatus comprising a tank, a track surrounding said tank, a support substantially at the center of the tank, an arm having its inner end carried on said support, sludge-engaging means carried by said arm, and means for supporting the outer end of said arm comprising a wheeled truck adapted to travel on said track, and articulated vertical and horizontal swivels located between and connecting the wheeled truck to the outer end of said arm whereby the truck can rock vertically and horizontally with respect to said arm.

JOHN MICHAEL CALLOW.